March 4, 1952
T. DE FOREST
2,587,705
FLAW DETECTION METHOD AND MEANS
FOR CARRYING OUT THE METHOD
Filed Nov. 6, 1944
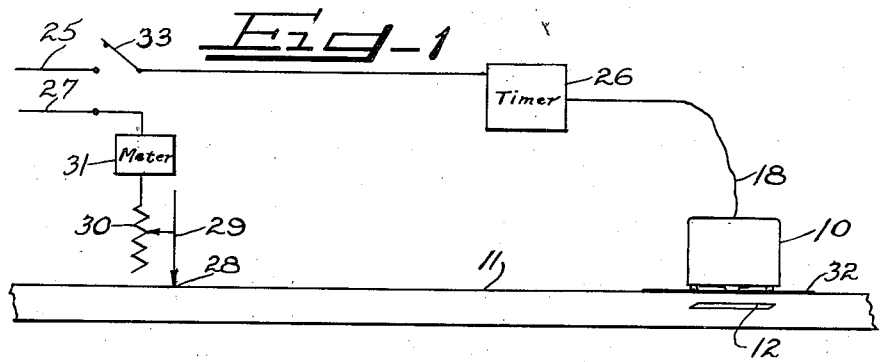
 
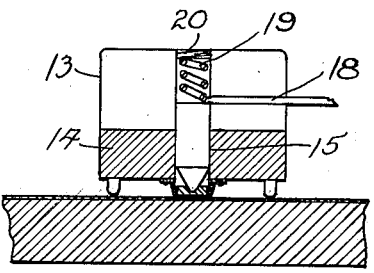 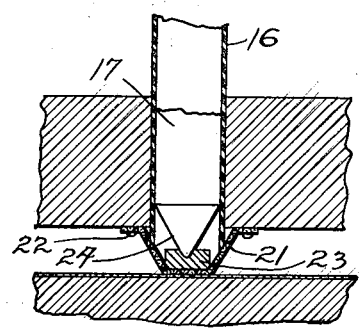
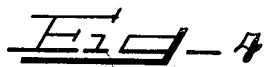 
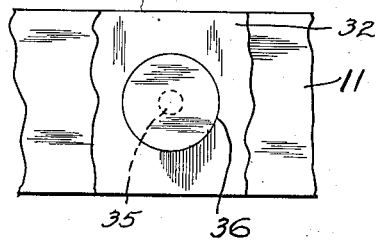 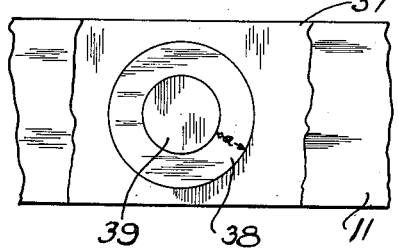
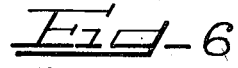
INVENTOR
Taber de Forest
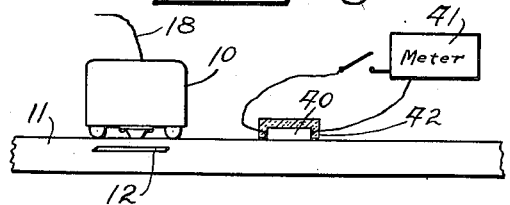

Patented Mar. 4, 1952

2,587,705

UNITED STATES PATENT OFFICE 2,587,705

FLAW DETECTION METHOD AND MEANS FOR CARRYING OUT THE METHOD

Taber de Forest, Chicago, Ill., assignor to Magnaflux Corporation, Chicago, Ill., a corporation of Delaware Application November 6, 1944, Serial No. 562,123

7 Claims. (Cl. 73—15)

My invention relates to a method of testing the homogeneity of a metallic body for determining the presence of flaws therein and to a contactor arrangement for use in carrying out this method.

Heretofore various methods have been employed for detecting flaws in a metallic body one such method including the heating of a portion of the body to be tested to a sufficient temperature and then noting the discoloration in the material. Such a method, of course, would have particular application to ferrous materials. Another method of testing the homogeneity of a metallic body which employs heat without the possibility of injuring the object by heating it to too high a temperature includes the steps of coating the surface of the object with a fusible material and then inducing a voltage in the object so as to produce a current sufficient to cause melting of the coating, and then noting the variations in the state of the fusible material as the result of the temperature changes. Such a method which is described in further details in Patent 1,869,336 to Alfred V. de Forest makes use of the heating effects of electric currents which are caused to flow in the body under test and is based on the theory that the density of the current, other things being equal, will be in inverse proportion to the cross section of the shortest path and therefore the heating effect is inversely proportional to the path through which the current is passing so that if there is a flaw or a thinner portion in the object to be tested, a greater portion of the fusible material will be melted thus giving an indication of the relative thicknesses in various parts of the object being tested.

It is an object of my invention to provide an improvement in the general thermal method of testing as described in the above mentioned de Forest patent.

It is another object of my invention to provide an improved method of determining the homogeneity of a metallic object by passing a current through the object to be tested in such a manner that variations in the resistance of the object being tested will not substantially affect the final determination.

It is a further object of my invention to provide an improved method of testing the homogeneity of a metallic object by comparing the effect of a heating cycle on a fusible coating on the object to be tested with the effect of a heating cycle on a fusible coating on a standard metallic object.

It is a still further object of my invention to provide an improved method of determining whether any flaws exist in a portion of a metallic object by heating the object and measuring the rate of heating so as to give an indication of the homogeneity of the object.

It is a still further object of my invention to provide an improved contactor arrangement for use in carrying out my improved method.

Further objects and advantages of my invention will become apparent from the following description referring to the accompanying drawings, and the features of novelty which characterize my invention will be pointed out with particularity in the claims annexed to and forming a part of this specification.

In the drawings:

Figure 1 is a diagrammatic representation of a circuit and apparatus with which I may carry out my improved method;

Figure 2 is an elevational view of the contactor arrangement as applied to a portion of the metallic object to be tested;

Figure 3 is an enlarged view of a portion of the contactor of Figure 2;

Figures 4 and 5 illustrate various steps in the carrying out of my improved method and will be employed in the description thereof; and Figure 6 is a diagrammatic representation of a modified method of determining the rate of heating of a test piece.

I have illustrated in Figure 1 an apparatus including my improved contactor arrangement 10 with which I can carry out my method of determining the homogeneity or detecting a flaw in any suitable type of metallic object 11 which is shown in the drawings as a portion of a bar of metal, but it will be understood that my invention may be employed with any suitable type of electrically conducting material. For the purposes of illustrating my invention the test object 11 is illustrated somewhat diagrammatically as having a slight flaw therein, and we will assume for the purposes of description of my invention that the contactor 10 is placed on a surface of the body 11 over the flow 12. The contactor 10 may be of any suitable construction and as shown more particularly in Figure 2 of the drawings it includes a casing 13 in which is housed a metallic member 14 having a bore 15 therein. When my improved method is employed in determining the flaws of a magnetic object the metallic member 14 may be formed of magnetic material so as to facilitate the application of a constant pressure of the contactor on the object to be tested. As will be seen more particularly in Figure 3, within the bore 15 is placed a sleeve 16 of suitable material such as insulating material in which a plunger 17 is slidable. One end of the plunger 17 is connected to a flexible cable 18 and the plunger 17 is biased in one direction through a loading spring 19. The upper end of the bore 15 may be closed in any suitable manner such as by a relatively short plug 20. The opposite end of the bore 15 is closed by a suitable conducting member 21, and as will be seen in Figure 3 this conducting member takes the form of a relatively thin screen member which is formed of suitable material such as copper mesh, the screen 21 being supported on the lower surface of the magnetic member 14 by suitable screws 22.

In order to minimize the effect of differences in resistances of various test pieces 11 in the final determination of their homogeneity, the test circuit includes a relatively high resistance so that the resistance of the test piece will be relatively small in comparison with the total resistance of the test circuit. This resistance may be placed in any suitable portion of the circuit, and a convenient arrangement of providing a resistance inludes a relatively small block 23 which is placed between the screen 21 and the plunger 17, the block 23 being formed of any suitable conducting material having a relatively high resistance such as carbon. In this position the heat from the block can be transmitted through the screen to the test piece. So as to obtain a relatively good electrical contact between the adjacent surfaces of the plunger 17 and the carbon block 23, the plunger is pointed at one end as is indicated by the numeral 24 and the block 23 has a depression into which the point projects.

In order to heat the metallic object under test from the relatively hot carbon block and to pass a predetermined amount of current through the contactor and a portion of the test piece 11 for a predetermined time, the contactor is connected to one side 25 of a source of potential through the cable 18 and a timer 26, the timer 26 being employed so that a predetermined amount of energy may be introduced into the test piece 11 for heating it for the purposes which will be described hereinafter. Another side 27 of a source of potential is connected to a suitable portion of the test piece 11 which portion identified by the numeral 28 in the drawings is spaced from the portion of the test piece 11 which is contacted by the contactor 10. Any suitable type of contacting arrangement 29 may be employed for effecting a connection with the point 28 with a relatively low resistance. The circuit also includes a variable resistance 30 and a suitable meter 31 which is an ammeter. Thus, through the variable resistance 30 the amount of current flowing in the test piece may be controlled and the meter 31 will give an indication of that current.

In practicing my improved method a coating of a suitable fusible material 32 is provided over that portion of the test piece in which it is desired to determine the homogeneity. The fusible material may be of any suitable type such as one having a softening point below that temperature which will injure the piece being tested, and so as to be able to determine reasonably accurately whether a flaw exists. The fusible material which is employed should have a relatively sharp melting point, such as stearic acid which melts at about 69.5° C.

In order to obtain an indication or factor by which the homogeneity of that portion of the test piece 11 which has been covered by the fusible material 32 may be determined by comparison with a known piece or standard, a switch 33 in the test circuit may be closed so that a predetermined amount of current will flow through the carbon block and test piece for a predetermined time, thus giving rise to a predetermined amount of heating effect in the test piece. It will be understood that any suitable amount of current may be made to pass through the carbon block and test piece depending upon the characteristics of the particular piece and the melting point of the fusible material employed, and for example, if a 1/8 inch piece of metal is tested one may employ about 50 amperes for about five seconds from a six volt source. It will be understood that either alternating or direct current voltage may be employed.

The fusible material such as the stearic acid may be applied in any suitable manner such as in a liquid form and by a spray, and when the coating hardens it leaves a blushed coating, that is a coating which is like a white pebbly substance. After a sufficient amount of current is passed through the carbon block and test piece to heat the test piece enough to cause a portion of the coating 32 to melt, the current is interrupted and the contactor itself is removed. Upon a removal of the current and contactor, that portion of the coating which melted will cool and reharden. Said rehardened area will have a distinctive glass or wax-like finish, so that one will be able to determine from inspection that amount of material which is melted and rehardened.

The amount of heat which is present to melt the fusible material will of course be dependent upon the time in which the current is flowing, heat absorption rate and resistance of the path through which the current flows, and value of the current. The time at which the current flows and the value of the current and therefore the heating effect of the carbon block may, of course, be determined through the timer 26 and the ammeter 31, and since the remaining indeterminate is the rate of heat absorbed by the test piece under the contactor which in turn is dependent upon the volume of metal heated, this will be a function of the size of the coating which becomes melted. Thus, for example, if the portion of the test piece 11 is devoid of any flaws, a certain amount of the meltable material will become melted. However, if there is a flaw such as that indicated by the numeral 12 in Figure 1, the amount of heat which is absorbed from the carbon block which acts as a source of heat as well as the rate at which heat is absorbed will be a function of the homogeneity of the body being tested. Therefore, the flaw 12 will produce a restricted portion which will increase the rate of heat absorption and cause a larger amount of the fusible material to melt than if a flaw or fissure were not present. It will therefore be apparent that by determining the size of that portion of the fusible material which has become fused during a testing cycle and comparing that with the size of that portion of fusible material which has become fused on a known standard which is devoid of flaws one may determine whether the test piece is homogeneous or not.

It will be understood that any heating effect of the current passing through the test piece will also be a function of the volume of the path in the test piece, but this effect will be secondary in character when the resistance of the carbon block is great with respect to that of the test piece. However, I have found it desirable to provide for the passage of current through the test piece rather than have an external return circuit from the heat application, since the reading of the meter 31 will give an indication of the electrical contact resistance between the screen 21 and the test piece, and thus this may be held constant for various tests by varying the resistance 30. Also, as the thermal contact resistance varies with changes in electrical resistance, by controlling the electrical contact resistance, I insure that heat is passing from the carbon block through the screen and to the test piece at a predetermined rate. By passing current from the screen to the test piece, heat is also obtained due to the contact resistance present, as well as whatever heating effect obtained from current passing through the test piece.

In order to minimize the number of variables or unknowns in this determination of the homogeneity of the test piece, the resistance of the contactor is made relatively large with respect to that of the test piece as has already been brought out above. It will be understood that other variables may include the resistance of the contact between the test piece and the contactor and in order to minimize such a difference a relatively constant or even pressure should be produced between the contactor and the test piece for the various pieces tested. This may be effected in any suitable manner such as by providing the copper plunger 17 which is relatively heavy. Also if a piece being tested is magnetic the magnetic member 14 will effect a pressure between the contactor and the test piece. Also since the resistance of carbon varies with its temperature by employing a relatively heavy copper plunger heat will be conducted relatively rapidly away from the carbon block 23 thus maintaining its temperature as well as its resistance relatively constant during the test cycle. In order to obtain a further indication of the contact pressure, a voltmeter may be employed across the test circuit and the pressure varied until the desired voltage is obtained.

Referring to Figure 4 I have illustrated diagrammatically that portion of the test piece which has been covered by a coating of the fusible material indicated generally by the numeral 32. As has been stated above, when the coating dries and before the current is applied this coating will have a particular characteristic such as being blushed, then as the current is applied and the coating melts a relatively small circle indicated by the numeral 35 is first produced, and as the coating melts the size of the circle which has become fused will increase, and it will be assumed that after the contactor 10 has been removed the amount of coating which has been fused and rehardened is indicated by that amount of material within the circle 36. It will be understood that this may be determined since the fusible material upon being fused and then rehardened will change its complexion so that there will be a contrast between that portion of the coating within the circle 36 and that outside which has not been used. The operator may then make comparison in any suitable manner between the size of the circle 36 and that which should be present in a relatively homogeneous piece similar to that which is being tested. Thus, the operator could have a table giving the size of the fusible circle in a standard piece, or he could have a standard piece and make a visual comparison. It will be understood that if a flaw is present the size of the circle 36 will be larger than in a similar standard or homogeneous object. It will be understood that this method may be employed in determining the relative thicknesses of two metals as, of course, the thinner material would have a larger circle of fusible material than the thicker one.

My improved method may be employed in determining the relative homogeneity of any suitable type of metallic material and for example, instead of merely determining whether a flaw is present in a body or object 11 my method may be employed for determining the quality of a spot-weld. Thus, the welded portion could be tested in the manner described above or the area near where the electrodes are placed may be coated and then the diameter of the spot melted during the welding cycle may be inspected and if the spot-weld is poor due to poor contacts or dirty electrodes or dirty sheets, the circle would be large.

If a fusible material is employed in which it is difficult to determine its change of state, that is when it has been melted and rehardened, a pigment, for instance graphite, could be mixed with the material before it is sprayed and before the coating is melted it would have a gray blush and after melting it would take on the color of the graphite as the stearic acid would become transparent.

In order to determine the rate of heating of the test piece so that the resulting determination will be substantially independent of ambient temperature two different fusible materials may be employed to provide coating, which materials have different melting points, and thus the relative difference between the amount at which the two coatings had melted will give an indication of the rate of heating of the test piece. Any suitable types of materials could be employed such as those having relatively sharp melting points and a material such as powdered sulphur or carnauba wax could be employed with the stearic acid. These coatings could be applied separately or the two materials could be mixed provided one is a suspension in the other. Also in order to facilitate the determination of the relative amounts of heating when the material which melts at a lower temperature is put on first the two circles would be superimposed as is illustrated in Figure 5. Thus, Figure 5 shows the test piece 11 which has been provided with two coatings 37 and after the test cycle the coating which has the lower melting point will produce a circle indicated by the numeral 38 while the material which has the higher melting point will produce a circle indicated by a numeral 39 and the difference in diameters of these two circles will give an indication of the rate of heating of the test piece. This difference marked by the letter $a$ in Figure 5 may then be compared with the difference in diameters of two circles on a similar standard piece, which had been similarly tested.

Any other suitable arrangement may be employed for determining the rate of heat absorbed by the test piece from the carbon block and in Figure 6 I have illustrated the test piece 11 with the heat applicator 10 and a resistance member 40 in contact with the test piece, the resistance member having a variable resistance temperature characteristic. The resistance member is connected to a suitable galvanometer bridge circuit 41 through a suitable source of power (not shown) so that the amount of current flowing through the resistor 40 and galvanometer 41 at any instant will be a function of the amount of heat absorbed by the test piece at that particular instant. Thus the change in the reading of the galvanometer for a predetermined time will give an indication of the rate of heating of the test piece which is a function of the homogeneity thereof. A covering 42 of heat insulating material is placed around the resistor 40 so as to minimize any heating of the resistor directly from the heat applicator 10.

Although I have shown and described particular embodiments of my invention I do not desire to be limited to the particular embodiments described, and I intend in the appended claims to cover all modifications which do not depart from the spirit and scope of my invention.

I claim as my invention:

1. The method of determining the homogeneity of a metallic object including the steps of coating the surface of the object to be tested with a fusible material having a relatively sharp melting point and a distinctive appearance upon rehardening, placing a contact member having a resistor over the coated surface so as to make a relatively good contact, passing a current through the contact member and the object in magnitude and time sufficient to produce heat capable of melting of a portion of the fusible material, removing the contact member and allowing the melted spot to harden, and measuring the size of the melted spot and comparing it with the size of a melted spot on a standard piece so that if a fissure is present in the tested object the size of the spot will be larger than that which is present on the standard piece.

2. The method of determining the homogeneity of a metallic object including the steps of coating the surface of the object to be tested with a single coat of fusible material having a relatively sharp melting point and a distinctive appearance upon rehardening, placing a contact member over the coated surface so as to make a relatively good contact, connecting the contact member in a test circuit having a relatively high resistance with respect to that of the object being tested so as to minimize the effect of variations in resistance in various objects on the final determination, passing a current through the test circuit including the contact member and the object in magnitude and time sufficient to cause melting of a portion of the fusible material, removing the contact member and allowing the melted spot to harden, and measuring the size of the melted spot and comparing it with the size of a melted spot on a standard piece so that if a fissure is present in the tested object the size of the spot will be larger than that on a standard piece.

3. The method of determining the homogeneity of a metallic object including the steps of coating the surface of the object to be tested with a fusible material having a relatively sharp melting point and having a distinctive appearance on rehardening, placing a resistor and contact member over the coated surface so as to make a relatively good contact, passing a current through the resistor, contact member and object in magnitude and time sufficient to cause melting of at least a portion of the fusible material, allowing the melted spot to harden, and measuring the size of the melted spot and comparing it with the size of a melted spot on a standard so that if a fissure is present in the tested object the size of the spot will be larger than that on a standard piece.

4. A heat applicator for testing the homogeneity of a metallic object having a surface, said applicator including a resistance block having a surface for producing heat upon current passing through said surface, and a metallic screen in engagement with said surface of said block for engagement with said surface of said object so that both electrical current and heat energy may pass from said block through said screen to said surface of said metallic object.

5. The method of testing for flaws in a metallic object including the steps of coating said object with a material having a distinctive appearance after being heated to a predetermined temperature, placing a resistor on the surface of the object so that upon current flow through said resistor in sufficient quantity and for sufficient time a limited quantity of said material is normally raised to said predetermined temperature, passing said current through said resistor and in the path of contact between said resistor and said object and obtaining an indication of that current for determining the thermal resistance of the contact, and determining the presence of flaws by observing the quantity of said material heated to said predetermined temperature.

6. The method of determining the homogeneity of a metallic object including the steps of coating a surface of the object with a plurality of superimposed meltable materials, each of said materials having a different melting point and a distinctive appearance upon melting by which said materials are visually distinguishable from each other, placing a contact member having a resistor over the coated surface so as to make a relatively good contact, passing a current through the contact member and the object in magnitude and for a time sufficient to produce heat capable of melting each of said materials, removing the contact member and allowing the melted materials to harden, measuring the difference in at least one dimension of the melted portions of the coating so ts to give an indication of the homogeneity of the object.

7. The method of determining the homogeneity of a metallic object including the steps of coating a surface of the object with a plurality of superimposed meltable materials, each of said materials having a different melting point and a distinctive appearance upon melting by which said materials are visually distinguishable from each other, providing the coating with the lower melting point adjacent the surface of the object and the coating with the higher melting point superimposed on the first coating, placing a contact member having a resistor over the coated surface so as to make a relatively good contact, passing a current through the contact member and the object in magnitude and for a time sufficient to produce heat capable of melting a portion of the meltable materials, removing the contact member and allowing the melted material to harden, and measuring the difference in at least one dimension of the melted portions of the coating so as to give an indication of the homogeneity of the object.

TABOR DE FOREST.

REFERENCES CITED

The following references are of record in the file of this patent:

UNITED STATES PATENTS

| Number | Name | Date |
|---|---|---|
| 1,869,336 | De Forest | July 26, 1932 |
| 2,128,228 | Betz et al. | Aug. 30, 1938 |
| 2,264,968 | De Forest | Dec. 2, 1941 |
| 2,323,715 | Kuehni | July 6, 1943 |

FOREIGN PATENTS

| Number | Country | Date |
|---|---|---|
| 134,791 | Great Britain | Nov. 13, 1919 |
| 377,500 | Great Britain | July 28, 1932 |